Figure 1:
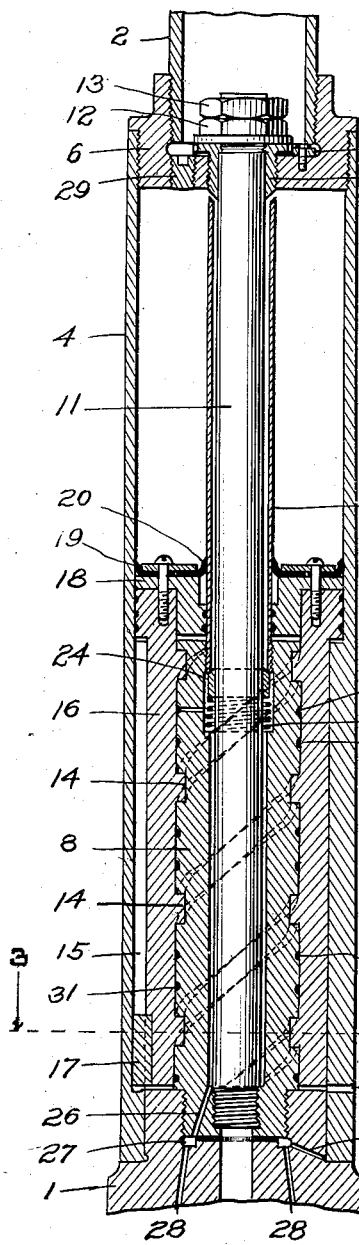

July 12, 1927.

F. L. O. WADSWORTH 1,635,593

LUBRICATION OF ROTARY MECHANISM

Filed Oct. 16, 1922  2 Sheets—Sheet 1

INVENTOR
F. L. O. Wadsworth

July 12, 1927.
F. L. O. WADSWORTH
1,635,593
LUBRICATION OF ROTARY MECHANISM
Filed Oct. 16, 1922   2 Sheets-Sheet 2
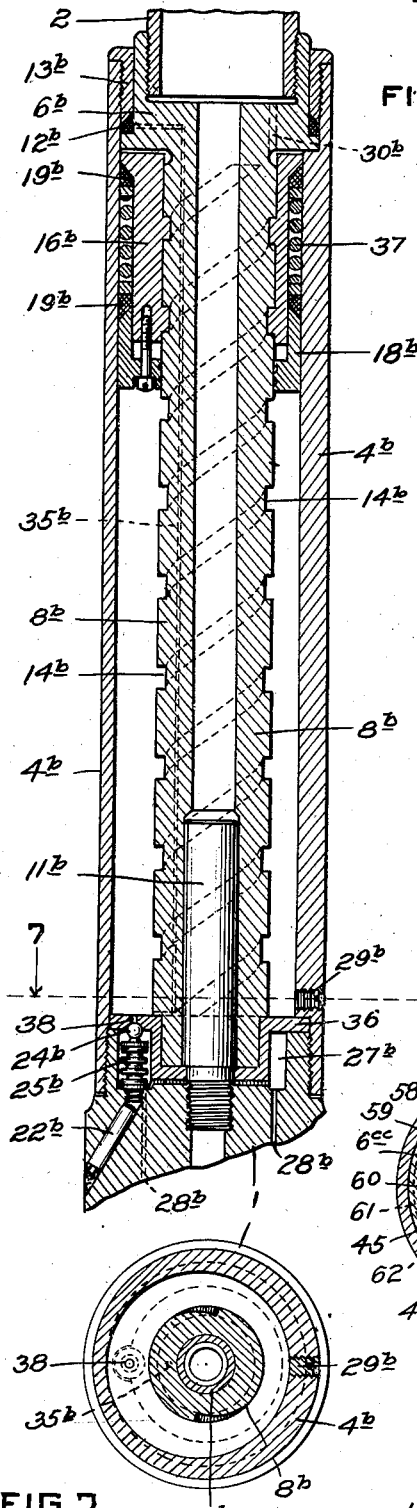
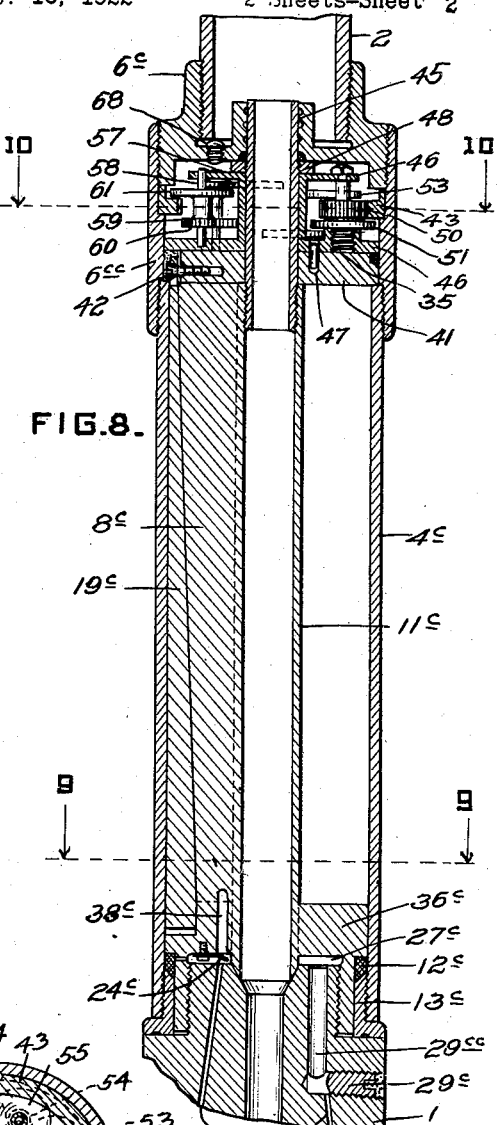
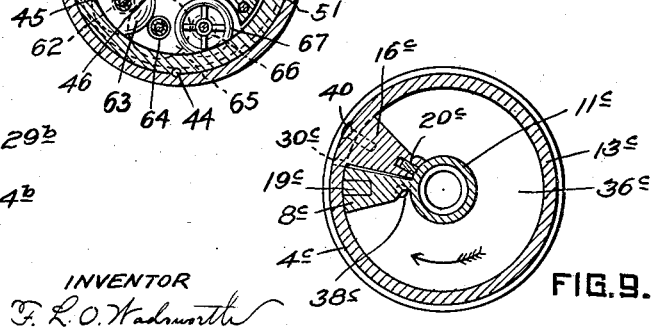
INVENTOR
F. L. O. Wadsworth Patented July 12, 1927.

1,635,593

UNITED STATES PATENT OFFICE.

FRANK L. O. WADSWORTH, OF PITTSBURGH, PENNSYLVANIA.

LUBRICATION OF ROTARY MECHANISM.

Application filed October 16, 1922. Serial No. 594,791.

My invention relates to the lubrication of the bearings of rotary drill tools, deep well pumps, and other mechanism which must operate in small holes at great distances below the surface of the ground, or in other inaccessible, or difficultly accessible positions; and one of the primary objects of my invention is the utilization of the torque, or twisting stress on the driving shaft of the apparatus to maintain a predetermined forced flow of oil or other unguent to the working parts of the mechanism as long as the latter is in operation.

Another general object of my present improvements is to provide a method and means for resolving a rotary movement of a driving shaft into two components, one of which serves to impart a reduced, or differential, speed of rotation to a driven element, and the other of which serves to establish and maintain a forced flow of lubricant from a suitable reservoir to the bearing surfaces of the moving parts. In the hereinafter described exemplifications of my invention these results are effected by interposing a mass of lubricant between the differentially rotatable elements of the organization and making use of this liquid mass (as a volumetrically flexible fluid clutch element) to assist in the transmission of the rotry movement from the driving to the driven members;—thereby creating on the said mass a reactive pressure that will force it through suitable ducts to the desired points.

A further object of this invention is to provide means for adjusting and controlling the rate of flow of the lubricant to the bearing surfaces under varying conditions of operation. In the illustrative constructions herein presented this object is accomplished, in some cases, by the use of a variable resistance in the path of flow, and in other cases, by the use of a mechanical governor that regulates the relative, or differential movement of the rotating parts; but in general the desired rate of discharge is adjusted and predetermined by varying and controlling the ratio between the angular velocities of the driving and the driven members.

Still another purpose of these improvements is to provide a simple, effective and reliable mechanism for lubricating the bearings of the revolving cutters of a deep well rotary boring tool, which will act efficiently and uninterruptedly over long continued periods of drilling, and which will not be dependent, in its action, on the use of a stream of flushing liquid, or other similar agency, for the removal of material from the bore hole. A further specific object of my invention is to produce a mechanism of this character which can be operated equally well in either vertical, or horizontal, or inclined, holes. The accompanying examples of my improved construction are particularly designed for use in conjunction with tools of the last mentioned type.

Figure 2:
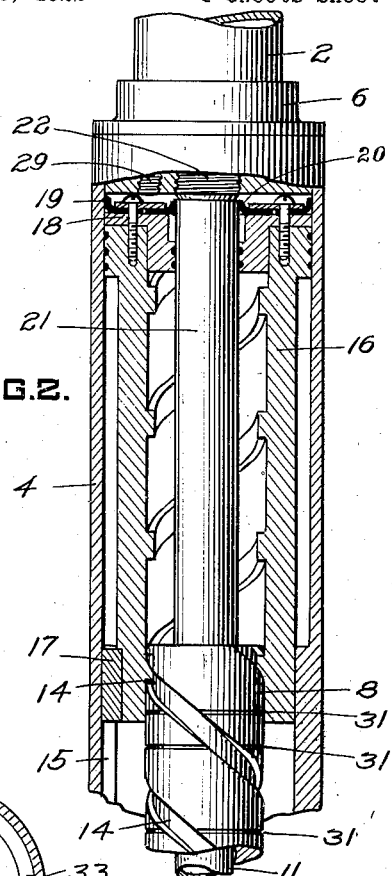
Figure 5:
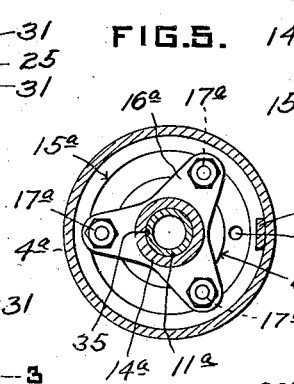
Figure 4:
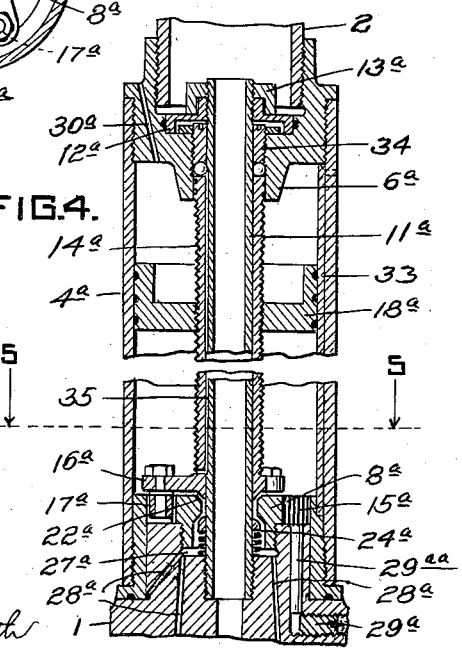
Figure 3:
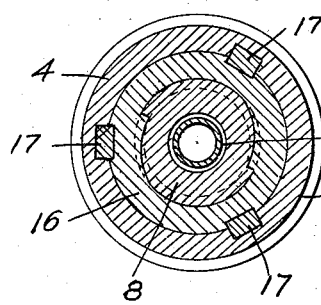

Other specific objects, and other detail features, of my improvements—as applied to rotary drill organizations—will be made apparent to those skilled in this art, by a consideration of the four illustrative embodiments of the present invention which are shown in the accompanying drawings in which:

Fig. 1 is a central longitudinal section through the head of a rotary drill which is provided with one form of my torque operated lubricator; Fig. 2 is a partial sectional elevation of this same construction with the parts thereof in the position which they occupy after an extended run; Fig. 3 is a cross-section on the plane 3—3 of Fig. 1; Fig. 4 is a partial longitudinal section of a rotary drill structure that is equipped with a second form of my improved lubricating mechanism; Fig. 5 is a sectional plan view on the plane 5—5 of Fig. 4; Fig. 6 is a view similar to that of Fig. 1 and illustrates still another embodiment of my present invention; Fig. 7 is a cross-section on the plane 7—7 of Fig. 6; Fig. 8 is a sectional elevation of a fourth illustrative exemplification of this invention; and Figs. 9 and 10 are cross-sections on the respective planes 9—9 and 10—10 of Fig. 8.

In the construction shown in Figs. 1, 2 and 3, 1 indicates the head member of a rotary drill that is provided with any desired type and form of cutters; and 2 designates the hollow drill stem through which a rotary movement is communicated to this head. The drill stem 2 is secured at its lower end to an enlarged tubular member 4 by means of the coupling sleeve or collar 6; and the head 1 is provided with an elongated boss or hub 8 which is centrally bored, and threaded at its lower end, to receive a tubular bolt 11 that extends upward through the collar 6, and carries at its upper end the washer and lock nuts 12—13. The hub member 8, is provided on its periphery with multiple thread grooves 14, that are preferably made of rectangular cross-section; and the lower portion of the member 4 is provided with three longitudinal key ways 15—15 etc., that terminate just above the surface of rotary engagement between the said member and the end of the drill head 1. The relatively rotatable parts 2—4 and 1—8 are operatively connected by a driving sleeve 16 which is threaded on its inner surface to closely engage with the spirally grooved boss, 8, and which carries, on its outer periphery, three inset keys, 17—17—17, that slide in the keyways 15. The upper end of this sleeve is closed by a piston head 18, which is provided with suitable cup washers 19 and 20, that make close sliding engagement with the inner surface of the member 4 and with the outer surface of a tubular extension 21 that is attached to the upper end of the boss 8. The upper extremity of the tube 21 terminates in close proximity to the adjacent face of the cap 6; and the annular passage way between the said tube and the hollow bolt member 11 can be partially closed, at the top, by means of an adjustable beveled end collar 22 that closely embraces the member 11 and is locked in adjusted position on the cap 6 by means of the dog 23. The lower end of the last mentioned passage way is normally closed by the valve 24 which slides on the member 11 and is held against the beveled extremity of the tube 21 by the coil spring 25. The lower portion of the passage way between the member 11 and the hub 8 communicates—through the duct 26—with an annular groove 27; and other ducts 28—28—28 etc. lead from this groove to the bearings of the drill head cutters and to the bearing between the drill head and the drill stem extension 4.

Before beginning operations the annular reservoir between the members 4—21, 6—18 etc. is filled with a suitable lubricant—by removing the plug 29—and the collar 22 is adjusted to give a predetermined restricted opening into the annular discharge passage way between the concentric tubes 11—21. The lock nuts 12, 13 are then screwed down until they make close working engagement with the flanged head of the said collar—thereby securing the drill head and drill stem members, 1—11 and 4—6 etc., in a fixed longitudinal, but relatively rotatable, relationship to each other. The drill stem 2 is then screwed into the collar 6 and the drill is lowered into position in the bore hole. During this phase of the procedure no pressure is exerted on the lubricant to force it out of the reservoir; and any up flow or back flow of external liquid, through the ducts and passages, 26—27—26 etc., into the said reservoir, is prevented by the automatic closure of the valve 24. When the drill head cutters come in contact with the bottom of the hole, and the drill stem is rotated, this rotative movement is communicated to the drill head through the driving sleeve 16; and the tangential pressure engagement between the spiral threads on the inner surface of this sleeve and the grooves 14 on the exterior of the drill head member 8, tends to move the said sleeve upward and thus force the lubricant above it out through the restricted discharge openings to the drill head bearings. The pressure thus exerted on the material above the sleeve head 18 depends in part on the driving torque and in part on the axial inclination or "pitch" of the spiral driving threads: and the rapidity of the discharge is controlled, in part by this pressure, in part by the viscosity of the lubricant used, in part by the initial tension imposed on the valve spring 25, and in part by the predetermined opening of the valve member 22. The last three of these control factors may be varied or preadjusted in advance, to meet, or correspond to, widely varied conditions of operation; and the first mentioned factor may be varied while the drill is in operation either by changing the speed of rotation or by increasing or decreasing the pressure on the drill head cutters. Other things being equal any increase in the working stress will be accompanied by a corresponding increase in the pressure on the unguent in the lubricant reservoir, and a consequent increase in the flow of this material to the working surfaces.

The upward movement of the driving sleeve and piston head 16—18 results in a constantly enlarging space between the lower end of the said sleeve and the top of the drill head, and also between the lower face of said piston and the top of the boss 8. The first mentioned space may be filled with the fluid surrounding the drill head and drill stem through a port 30 in the side of the member 4; but the other opening is preferably sealed against the entry of this fluid by the close fitting engagement of the threaded members 8 and 16 and also by the series of circumferential fluid packing grooves 31, 31 etc. The separation of the parts 8—18 may therefore produce a partial vacuum under the central portion of the piston 18 and thereby assist the partially confined lubricant above the piston in acting as a fluid clutch that will restrain the upward sliding movement of the driving sleeve 16, and will thus coact with the said sleeve in transmitting the rotary movement of the drill stem parts 2—6—4 to the drill head member 8. When, in the course of the normal operation, the members 16—18 have been moved upwardly until they engage with the cap 6 (as shown in Fig. 2) all further differential movement of the torque transmitting elements 4—16—8 is arrested, and the assemblage will then revolve as an integral unit. The drill stem and drill head members, 4—8, may also be locked in integral and substantially rigid relationship at any desired point in the longitudinal movement of the driving sleeve 16, by screwing down the valve collar 22, until it engages the top of the tube 21 and thereby shuts off substantially all escape of fluid from the chamber above the piston head 18.

In the construction shown in Figs. 4 and 5, the drill head 1 is provided with a gear $8^a$ which is secured in a central recess at the top of the said head, and a tubular bolt member $11^a$, is also screwed into the bottom of this recess and extends upward through the drill stem coupling $6^a$. The coupling $6^a$ serves to connect the drill stem 2 with an enlarged tubular member $4^a$ which is provided at its lower extremity with an internal gear collar $15^a$ that is rotatably engaged with the upper end of the drill head 1. The gear members $8^a$ and $15^a$ are operatively connected by gear pinions $17^a$—$17^a$—$17^a$ which are mounted on a spider frame $16^a$ that is revolvably supported by the tubular bolt $11^a$ and is provided with a threaded stem or hub $14^a$. This threaded portion is tightly engaged with a piston $18^a$ that is adapted to slide longitudinally in the member $4^a$, but is held against rotation therein by the spline or rib 33. The lower end of the rotatable spider frame $16^a$—$14^a$ is beveled to form a valve plug $22^a$ which is adapted to cooperate with a conical seat in the adjacent face of the gear $8^a$; and the opening between these parts may be adjusted and controlled by means of the screw plug 34 in the cap $6^a$. This opening communicates—through the spring closed valve $24^a$—with an annular space $27^a$ from which ducts $28^a$ lead to various drill head bearings. The tubular bolt $11^a$ is grooved on one side to provide another duct 35 that communicates, at one end, with the space below the piston $18^a$, and at the other end, with the thrust bearing between the plug 34 and the upper end of the spider-screw-frame $16^a$—$14^a$; and the assembled parts are held in fixed axial, or longitudinal, relationship by the washer and lock nuts $12^a$—$13^a$, which are screwed onto the upper end of said tubular bolt member. This hollow bolt $11^a$—like the correspondingly designated part 11 of the first described construction—may also serve to conduct a stream of flushing liquid from the lower end of the hollow drill stem 2 to a suitable opening in the drill head 1.

In this construction the annular space between the member $4^a$—$14^a$ and below the piston $18^a$ serves as a lubricant reservoir; and the space above this piston is in communication with the fluid surrounding the drill stem through a port or passage way $30^a$. When the drill stem members, 2—$6^a$—$4^a$—$15^a$, are revolved, the angular movement is communicated to the drill head parts 1—$8^a$ through the toothed pinions $17^a$ which act as keys; but the torque, or tangential stress, on the spider support for these key pinions tends to revolve the screw $14^a$ and draw the piston $18^a$ toward the drill head. This movement imposes a pressure on the lubricant below the piston and forces it through the restricted openings, below the valve $22^a$ and above the valve $24^a$, to the grooves and ducts $27^a$—$28^a$. The same action forces a constant supply of the unguent through the passage way 35 to the thrust bearing at the top of the screw stem $14^a$, and thus prevents water and grit from entering this bearing. The relatively differential movement of the transmission gears $15^a$—$17^a$—$8^a$ (and the consequent ratio between the angular movement of the head 1 and the longitudinal movement of the piston $18^a$) may be restricted—in the initial design of the parts—by the pitch of the screw $14^a$; but this movement may also be governed and controlled under varying conditions of operation by adjusting the valve member $22^a$, and thereby altering the resistance to the volumetric change in the mass of the viscous liquid which is interposed between the relatively movable parts and which acts as a fluid transmission clutch for the said parts.

The organization shown in Figs. 6 and 7 corresponds quite closely to that illustrated in Figs. 1 to 3. In the third exemplification of the present invention the tubular member $4^b$ is secured to the drill head 1; and the spirally grooved or threaded stem $8^b$ is attached to, or is integral with, the coupling collar $6^b$ into which the lower end of the drill stem 2 is screwed. The lower end of the hollow stem $8^b$ is rotatably supported in a step bearing collar 36 which is clamped in place against the top of the head 1 by the shouldered terminal portion of the outer tubular member $4^b$ and also by the shouldered end of the central tube $11^b$ that projects up into the lower end of the hollow stem and serves as an additional guide and bearing element therefor. The relatively rotatable drill head and drill stem members are held in fixed longitudinal relation by these lower terminal bearings and by an upper metal packing ring and sleeve nut, $13^b$—$13^b$, which are carried by the tube $4^b$, and which also serve as upper guide bearings for the said members. The drill head member $4^b$ is eccentrically bored to receive a driving sleeve $16^b$, which is provided with a piston head $18^b$ that engages closely both with the exterior periphery of this stem and with the eccentric bore of the exterior sleeve $4^b$. The driving sleeve 16$^b$ and the piston head 18$^b$ are slidably engaged with each other, and are normally held in expanded position by means of a strong spiral spring 37, which also serves to maintain the beveled packing rings, or washers, 19$^b$, 19$^b$, in close working engagement with the wall of the chamber in which the parts move. The thrust bearing ring 36, at the bottom of this chamber, is provided with a restricted port opening 38 which is normally closed by a ball valve 24$^b$ that is mounted on the flexible wall fluid pressure cell, or "sylphon" 25$^b$; and the interior of this cell can be charged with air or other gas or vapor, to any desired and predetermined pressure, through the Schrader valve 22$^b$ that is sealed into the side of the drill head 1. The annular space 27$^b$—in which the valve elements 24$^b$—25$^b$ are bearings in the head by ducts 28$^b$, 28$^b$ etc.; mounted—is connected with the various and the lower end of the eccentric annular chamber, between the parts 4$^b$—8$^b$, may, if desired, be connected to the upper bearing, between the parts 6$^b$—12$^b$—13$^b$, by means of the restricted duct 35$^b$.

In the use of this last described organization the chamber last mentioned is filled with oil or other suitable lubricant, through the opening that is closed by the plug 29$^b$. When the drill head is lowered into position on the bottom of the bore hole and the drill stem is revolved, the rotary movement of the spirally grooved stem 8$^b$ is transmitted to the drill head member 4$^b$ through the eccentric driving sleeve 16$^b$ and its attached head 18$^b$; but the torque pressure engagement between the sides of the spiral grooves 14$^b$ and the cooperating threads on the sleeve 16$^b$, imposes a longitudinal stress on the latter member and moves it downward at a rate which is determined by the pitch of the screw thread elements and by the fluid resistance offered by the confined mass of lubricant. This resistance can be varied as may be desired—to meet varying conditions of operation—by using unguents of different viscosities, and by increasing or decreasing the fluid spring pressure on the discharge valve element 24$^b$. If the pressure exerted on the confined mass exceeds the initial tension of the piston spring 37 the latter will yield slightly and thus provide an automatic elastic equalizer which will serve to maintain a uniform flow of lubricant through the port 38 even when the driving torque fluctuates through a considerable range.

The downward movement of the sleeve 16$^b$ leaves a space between the upper end of the said sleeve and the cap 6$^b$. This space may be placed in communication with the interior of the drill stem through an aperture 30$^b$; or it may be completely closed off from other parts of the apparatus, in which case the separation of the members 16$^b$—6$^b$ will create a partial vacuum in the expanding space and thereby supplement the effect of the liquid clutch pressure on the piston head 18$^b$ in restraining the sliding movement of the driving sleeve on the parts 4$^b$—8$^b$. The hollow stem 8$^b$ and the tubular guide bearing member 11$^b$ form a continuous passage for conducting a stream of flushing liquid from the drill stem to a central aperture in the drill head. When the drilling operations are arrested, either by lifting the drill head from the bottom of the bore hole or by stopping the rotation of the drill stem, the pressure on the material in the lubricant reservoir is relieved and the valve 24$^b$ will immediately close, thereby preventing any further flow of unguent to the drill head bearings, and also preventing any back flow of liquid from these bearings into the reservoir.

Figs. 8, 9 and 10 depict another illustrative embodiment of the present improvements. In this fourth exemplification of my invention the lower end of the drill stem 2 is coupled to a tubular member 4$^c$ by means of the cap 6$^c$ and the collar 6$^{cc}$. The drill head 1 is threaded at its upper end to receive a cap 36$^c$ that carries an upwardly extending tubular member 11$^c$ and a sector, or radius block 8$^c$—these three parts being suitably secured together to form a substantially integral assemblage which can be screwed as a unit onto the threaded drill head. The outer edge of the block 8$^c$, and the adjacent portion of the cap 36$^c$, are longitudinally grooved to receive a wedge shaped packing strip 19$^c$, which serves to maintain a liquid tight joint between the surfaces of the relatively rotatable members 4$^c$—8$^c$. The tubular member 4$^c$ carries another sector shaped block 16$^c$ which is detachably secured to the said member (as by screws 40) and which is fitted to make close sliding engagement with the surface of the inner tube 11$^c$;—the sliding joint between these parts being provided with a spring pressed packing strip 20$^c$ for the purpose of preventing leakage of liquid through that joint. The top of the segmental chamber between the parts, 4$^c$—11$^c$, 8$^c$—16$^c$— which constitutes the lubricant reservoir of this construction—is covered by a head 41 which is bolted down on the upper end of the connected members 8$^c$—11$^c$, and which is provided with a taper headed screw 42 that engages the slotted end of the packing strip 19$^c$ and serves to hold the latter in adjusted position in its wedge shaped groove. The outer edge of the head 41 engages with the upper end of the tubular member 4$^c$ and maintains a tight end to end engagement between the relatively movable parts, 4$^c$—16$^c$ and 1—36$^c$—11$^c$—41; and the drill head and drill stem members, 1—36$^c$ and 2—6$^c$—6$^{cc}$—4$^c$, are further held against longitudinal displacement by means of the metal packing ring and clamp sleeve 12ᶜ—13ᶜ which engage the shouldered peripheral surface of the cap 36ᶜ. The lower end of the lubricant reservoir is provided with a port 38ᶜ which opens into the annular space 27ᶜ between the cap 36ᶜ and the drill head 1; and the lower end of this port is provided with the gravity flap valve 24ᶜ. Ducts 28ᶜ, 28ᶜ, lead from the space 27ᶜ to the various bearings, that are to be supplied with lubricant, and an aperture 29ᶜᶜ (which is closed by the plug 29ᶜ) is provided at one side of the head for the purpose of refilling the emptied or partially emptied reservoir through the normally open valve and passage way 24ᶜ—38ᶜ.

When the last described tool is in operation the rotary movement of the drill stem members, 2—6ᶜ—6ᶜᶜ—4ᶜ—16ᶜ, is communicated to the drill head assemblage, 8ᶜ—11ᶜ—41—36ᶜ—1, through the frictional engagement of the cooperating parts, and also through the mass of lubricant in the segmental chamber between the sector blocks 16ᶜ—8ᶜ; and the larger component of this tangential or circumferential driving pressure acts directly on the confined unguent and forces it through the passage ways and ducts 38ᶜ—27ᶜ—28ᶜ etc. to the drill head bearings. This pressure will also maintain a film of lubricant between the relatively rotating surfaces of the parts 4ᶜ—12ᶜ—13ᶜ—36ᶜ, and 4ᶜ—6ᶜᶜ—41 at the bottom and top of the lubricant reservoir, and thus serve to exclude water and dirt from those bearings. The differential movement of the member 4ᶜ, with respect to the drill head parts 1—36ᶜ—11ᶜ, results in the gradual clockwise separation of the initially contiguous faces of the blocks 8ᶜ—16ᶜ; and the expanding space between these faces is filled with the fluid surrounding the drill stem through a small port opening 30ᶜ in the tubular member 4ᶜ. The hydraulic resistance to the discharge of the lubricant through the restricted ducts 28ᶜ is always somewhat greater than the pressure of this surrounding fluid; and the ratio between the angular velocities of the driving parts 2—4ᶜ—16ᶜ etc. and the driven members 8ᶜ—11ᶜ—1 etc., can be controlled by varying this resistance in the manner previously described (i. e., by substituting a spring closed valve similar to that indicated at 24ᵇ—25ᵇ in Fig. 6 for the gravity valve 24ᶜ). But in this organization I have employed, for this purpose, a somewhat different means of control which will now be described:

The sleeve connection 6ᶜᶜ is bored out to receive an annular gear 43 which is held in non-rotatable relation to the sleeve, by keys or pins 44—44, and which is clamped in place therein by the end of the coupling cap 6ᶜ. The tubular member 11ᶜ is provided with a hollow extension 45 which projects up through a liquid tight bearing in the coupling cap 6ᶜ, and which carries a spool shaped frame 46—46 that is held in fixed position on the head 41 by means of the dowel pin 47 and the nut 48. The frame 46 supports the shaft bearings of a train of gears 50, 51 to 66; which are connected together in successive pairs 50—51, 52—53, etc.; and the shaft of the terminal gear 66 also carries a balance or escapement wheel—or other suitable governor—67, that regulates and controls the relative angular movement of the parts 6ᶜᶜ, and 46—41, and thus governs the rate of discharge of material from the contracting lubricant reservoir. The closed chamber in which this train of gearing is contained is preferably filled with some very mobile oil—through some suitable opening such as the one indicated at 68—that will serve to protect and lubricate this control mechanism and will also assist in sealing the packed joint between the parts 46—41, and 6ᶜᶜ—4ᶜ. The entire structural combination of gear and gear support elements 43 to 66 may be exposed, and if desired, readily removed as an assembled unit, by taking off the coupling cap 6ᶜ and the nut 48; and the ratio of the angular velocities of the members 4ᶜ—16ᶜ and 8ᶜ may be varied as desired by changing the period of the governor 67, or by moving the shaft which carries it to another point in the train;—this last procedure being made possible by the fact that the pinion-governor pair 66—67 may be substituted for any one of the preceding pairs, 64—65, 62—63, etc., etc.

It will be obvious to engineers, and others familiar with the class of devices hereinbefore described, that the mechanical governor mechanism last described may be used, if desired, to regulate and control the relative, or differential, movements of the drill head and drill stem members, 4—8, or 4ᵃ—8ᵃ, or 4ᵇ—8ᵇ (which constitute parts of the first three exemplifications of my invention) in the same manner as it is utilized to restrain and determine the relative angular motion of the parts 4ᶜ—16ᶜ and 8ᶜ of Figs. 8, 9 and 10. And it will also be obvious that other forms of governing devices—such for example, as a clepsydia or a liquid dash pot mechanism—may be used to obtain the same results as are secured by the employment, either of the gear wheel governor train (43—67) that is illustrated in Figs. 8 and 10, or of the throttle valve elements (24, 24ᵃ or 24ᵇ) that are shown in Figs. 1, 4 and 6.

Numerous other changes may be made—both in the form and arrangement of the parts—without essentially changing the characteristic features of the improved organizations hereinbefore described; and with this disclosure as a guide those skilled in the art can utilize these improvements (in whole or in part, as may be desired) in conjunction with many different types of rotary boring tools, deep well pumps, and analogous rotor driven structures, which must be operated at locally inaccessible points, and which must be continuously supplied with lubricant for long extended periods of operation. I do not, therefore, regard the previously described exemplifications of my invention as limiting it to one particular field of application; nor do I wish to otherwise limit its scope except as indicated in the accompanying claims, to-wit:

1. The method of supplying lubricant to bearings on a train of revolving members which consists in interposing a fluid mass of unguent between the driving and driven elements of the said train and subjecting the said mass to a component part of the driving torque, exerted by the driving elements.

2. The method of feeding lubricant to the bearings of a power driven member which consists in resolving the force acting thereon into two components, utilizing one of said components to apply pressure to a mass of unguent and thereby force it to the said bearings and utilizing the other of said components to move the said member.

3. The method of feeding lubricant to the bearings of a power driven member which consists in resolving the driving force into two components, utilizing one of said components to apply pressure to a mass of unguent and thereby force it to the said bearings and utilizing the other component to transmit a predetermined differential movement from the driving to the driven member.

4. The method of supplying lubricant to bearings on a driven member which consists in interposing a mass of unguent between the said member and a driving element, submitting said mass to a part of the driving torque exerted by said element, and utilizing the difference between the angular velocities of the driving element and the driven member in controlling the rate of flow of the lubricant.

5. The method of forcing lubricant to bearings on a train of mechanism which consists in interposing a mass of unguent between differentially movable elements of the said train, subjecting the said mass to a part of the driving pressure on one of said elements, and controlling the differential movement of that element with respect to its associates.

6. The method of forcing lubricant to the bearings of a deep well rotary boring tool which consists in interposing a mass of viscous unguent between two relatively movable members that are attached respectively to the drill stem and the drill head, subjecting the said mass to a portion of the angular driving pressure exerted by the said stem on the said head, and controlling the flow of the lubricant to the said bearings by varying the resistance to the flow of lubricant from said chamber.

7. In a lubricating mechanism for power driven devices the combination of a driving member, a driven member rotatively movable with respect thereto, means for holding a mass of unguent between said relatively movable members, means for conducting said unguent to the bearings of the device, and means for controlling the differential rotary movements of the driving and driven parts.

8. In a lubricating mechanism for two relatively rotatable members the combination of means for holding a mass of viscous unguent between said members, with other means for conducting said unguent to bearings on one of said members, and control devices to regulate the flow of lubricant to said bearings when the said members are subjected to an external driving force.

9. In a lubricating structure for two series connected and relatively rotatable members, the combination of a volumetrically variable lubricant chamber between these members, ducts leading from this chamber to bearing surfaces on one of the said members, and means for moving one of the walls of the said chamber to diminish the volume thereof when movement is transmitted from one to the other of the aforesaid members.

10. In a rotary boring tool the combination of a drill head, a drill stem rotatably mounted thereon, a yielding clutch member interposed between said relatively rotatable parts and comprising as one of its elements a mass of viscous lubricant confined in a volumetrically variable chamber, and ducts leading from said chamber to bearing surfaces on the said head.

11. In a rotary boring tool the combination of a drill head, a drill stem rotatably coupled thereto, a volumetrically variable lubricant chamber interposed between said relatively rotatable parts, a yielding clutch member comprising as one of its elements a mass of unguent within said chamber, and ducts leading therefrom to the bearings of the said drill head.

12. In a rotary boring tool the combination of a drill head, a cutter rotatably mounted thereon, a drill stem longitudinally fixed but rotatably connected thereto, a chamber between said relatively rotatable parts, ducts leading from said chamber to the bearing of said cutter, and means for diminishing the volume of said chamber by the rotation of the drill stem.

13. In a rotary boring tool the combination of a drill head carrying cutters, a drill stem, a yielding clutch mechanism for operatively connecting said stem to said head and a lubricant chamber interposed between said parts and having a movable wall and means for controlling the movement of said wall with respect to the movement of the said drill head to regulate the delivery of lubricant from said chamber to the bearings of said cutters.

14. In a rotary boring tool the combination of a drill head for supporting a series of revolving cutter bits, a drill stem for rotating said head, means for coupling said stem to said head in an axially fixed but relatively rotatable relation, a yielding clutch connection between the relatively rotatable parts, means for varying the yield or slip of said clutch to alter the differential angular velocities of the drill stem and drill head; and means for utilizing this slip to feed lubricant to the bearings of the aforesaid cutter bits.

15. A rotary boring tool for deep wells which comprises a drill head for supporting the boring bits, a drill stem for rotating said head, a lubricant chamber between said driving and driven parts, a clutch mechanism operatively connecting these parts and having an element that is movable within said chamber, ducts leading therefrom to the bearing surfaces on the said head, and means for controlling the flow of lubricant through said ducts when the drill stem is revolved.

16. A deep-well rotary boring tool which comprises a head, a drill stem longitudinally fixed but relatively rotatable with respect thereto, a yielding clutch mechanism operatively connecting these relatively rotatable parts, a lubricant chamber interposed between said parts and having a movable wall that constitutes a part of said clutch mechanism, ducts leading from said chamber to the bearing surfaces on said head, and means for controlling the movement of said chamber wall with respect to the rotary movement of said drill stem and thereby governing the discharge of lubricant from the said chamber through the said ducts.

17. In a rotary boring tool the combination of a drill stem, a head rotatively movable with respect thereto and carrying cutters, a lubricant chamber interposed between these members, means actuated by the relative movement of said members to vary the volume of said chamber, a passage way leading therefrom to bearings of said cutters, and a one way valve located in said passage way for preventing any inflow of fluid to said chamber.

18. In a rotary boring tool the combination of two relatively rotatable members, a differential clutch mechanism for yieldingly connecting said members, a lubricant chamber interposed between them and having a movable wall that constitutes a part of the said clutch, a passage way leading from the said chamber to bearings on the said members, and means for governing the outflow of lubricant from the said chamber through the said passage way and for preventing any reverse inflow of fluid therein.

19. A rotary boring tool which comprises a drill stem, a head rotatively movable with respect thereto and carrying cutters, a threaded stem secured to one of said members, a threaded piston operatively engaged with said stem and longitudinally movable with respect to the other of said members, a lubricant chamber having one of its walls formed by said movable piston, a passage way leading from said chamber to bearings of said cutters, and means for regulating the longitudinal movement of said piston in said chamber when the said members are rotated.

20. A rotary boring tool which comprises two relatively rotatable parts, a volumetrically variable lubricant chamber positioned between them, a spirally grooved member secured to one of said parts, a second member operatively engaged by the grooves of the first member and constituting one wall of the said chamber, means for holding said second member in non-rotatable but longitudinally movable relation to the other of said relatively rotatable parts, means for controlling the longitudinal movement of said second member when the parts are rotated and thereby governing the rate of volumetric variation in the size of said lubricant chamber, a discharge opening leading from this chamber to parts to be lubricated, and means located in said opening for preventing any reverse inflow of fluid thereto.

21. In a rotary boring tool, the combination of a drill stem, a relatively rotatable head mounted thereon, a lubricant chamber communicating with bearings on said head and a lubricant forcing member located in said chamber and actuated by the relative rotary movement between said stem and said head.

22. A method of feeding lubricant to the cutter bearings of a rotary drilling tool, which comprises interposing a substantially confined mass of lubricant between the rotating stem and the cutter carrying head of a rotary drilling tool, transmitting rotating forces acting on the stem to the head through said lubricant, and employing a component of the forces so transmitted in feeding lubricant from said substantially confined mass to the cutter bearings.

In testimony whereof I have hereunto set my hand.

FRANK L. O. WADSWORTH.